(12) United States Patent
Lai et al.

(10) Patent No.: US 12,332,833 B2
(45) Date of Patent: Jun. 17, 2025

(54) MODULAR WIRELESS SENSOR ARCHITECTURE FOR INTERNET OF THINGS

(71) Applicant: Brocere Electronics Co. Ltd., Taipei (TW)

(72) Inventors: Chih-Hao Lai, Taipei (TW); Jou-Hung Wang, Taipei (TW)

(73) Assignee: Brocere Electronics Co. Ltd., Taipei (TW)

( * ) Notice: Subject to any disclaimer, the term of this patent is extended or adjusted under 35 U.S.C. 154(b) by 106 days.

(21) Appl. No.: 18/503,911

(22) Filed: Nov. 7, 2023

(65) Prior Publication Data
US 2024/0152481 A1    May 9, 2024

(30) Foreign Application Priority Data
Nov. 8, 2022  (TW) .................. 111142656

(51) Int. Cl.
*G06F 13/42*   (2006.01)
*G16Y 20/00*   (2020.01)

(52) U.S. Cl.
CPC .......... *G06F 13/4282* (2013.01); *G16Y 20/00* (2020.01); *G06F 2213/0042* (2013.01)

(58) Field of Classification Search
CPC ...................................................... G02B 5/08
See application file for complete search history.

(56) References Cited

U.S. PATENT DOCUMENTS

| | | | |
|---|---|---|---|
| 9,577,392 B2 * | 2/2017 | Chang | G06F 13/4068 |
| 9,949,047 B2 | 4/2018 | Ryu | |
| 10,499,123 B2 | 12/2019 | Basheer et al. | |
| 2015/0356051 A1 | 12/2015 | Benson et al. | |
| 2017/0316683 A1 | 11/2017 | Pietrasik et al. | |

FOREIGN PATENT DOCUMENTS

TW   M633816   11/2022

OTHER PUBLICATIONS

Lee, S. "DisplayPort over Type-C 2.0 Getting Started and Specifications Update;" retrieved from https://web.archive.org/web/20220820044431/https://www.graniteriverlabs.com/zh-tw/technical-blog/displayport-over-type-c-2-0-specification-updates; Jan. 19, 2022; Granite River Labs Blog; Taiwan. (Machine Translation by Google) (Ref. 01).

Choate, J. "VESA—DisplayPort(TM) Alternate Mode on USB-C." retrieved from https://www.usb.org/sites/default/files/D2T1-4%20-%20VESA%20DP%20Alt%20Mode%20over%20USB%20Type-C.pdf; Nov. 20, 2019; p. 19-p. 24; USB Implementers Forum; Taipei, Taiwan. (Ref. 02).

\* cited by examiner

*Primary Examiner* — Henry Tsai
*Assistant Examiner* — Juanito C Borromeo
(74) *Attorney, Agent, or Firm* — CKC & Partners Co., LLC

(57) ABSTRACT

A modular IoT sensor system for Internet of things includes a network module and an expanded sensor module. The expanded sensor module includes a male connector and a female connector respectively disposed in two connection surfaces of the expanded sensor module, configured to detachably connect to a female connector of the network module. Shape and size of the female connector of the network module and the male connector and the female connector of the expanded sensor module conform to a USB type-C specification and pin definitions thereof are complied with a first pin definition different from USB type-C specification.

20 Claims, 11 Drawing Sheets

PD1

| Pin | A1 | A2 | A3 | A4 | A5 | A6 | A7 | A8 | A9 | A10 | A11 | A12 |
|---|---|---|---|---|---|---|---|---|---|---|---|---|
| Pin definition | GND | SPG1 | | VBUS | | PDG | | | VBUS | SPG2 | | GND |
| Pin definition | GND | SPG3 | | VBUS | | PAG | | | VBUS | SPG2 | | GND |
| Pin | B12 | B11 | B10 | B9 | B8 | B7 | B6 | B5 | B4 | B3 | B2 | B1 |

| Pin | A1 | A2 | A3 | A4 | A5 | A6 | A7 | A8 | A9 | A10 | A11 | A12 |
|---|---|---|---|---|---|---|---|---|---|---|---|---|
| Pin definition | GND | ISC_SDA | ISC_CLK | VBUS | DIN/DOUT1 | DIN/DOUT2 | DIN/DOUT3 | DIN/DOUT4 | VBUS | SPI_CLK | SPI_MISO | GND |
| Pin definition | GND | UART+ | UART- | VBUS | AIN1 | AIN2 | AIN3 | AOUT | VBUS | SPI_CLI | SPI_MISI | GND |
| Pin | B12 | B11 | B10 | B9 | B8 | B7 | B6 | B5 | B4 | B3 | B2 | B1 |

| Pin | A1 | A2 | A3 | A4 | A5 | A6 | A7 | A8 | A9 | A10 | A11 | A12 |
|---|---|---|---|---|---|---|---|---|---|---|---|---|
| Pin definition | GND | SPG31 || VBUS | | PDG || | VBUS | | PCIG || GND |
| Pin definition | GND | SPG32 || VBUS | | PAG || | VBUS | | PCIG || GND |
| Pin | B12 | B11 | B10 | B9 | B8 | B7 | B6 | B5 | B4 | B3 | B2 | B1 |

| Pin | A1 | A2 | A3 | A4 | A5 | A6 | A7 | A8 | A9 | A10 | A11 | A12 |
|---|---|---|---|---|---|---|---|---|---|---|---|---|
| Pin definition | GND | UART1+ | UART1- | VBUS | DIN/DOUT1 | DIN/DOUT2 | DIN/DOUT3 | DIN/DOUT4 | VBUS | VIN+ | VIN- | GND |
| Pin definition | GND | UART2+ | UART2- | VBUS | AIN1 | AIN2 | AIN3 | AOUT | VBUS | VS | VBAT | GND |
| Pin | B12 | B11 | B10 | B9 | B8 | B7 | B6 | B5 | B4 | B3 | B2 | B1 |

Fig. 9B

MODULAR WIRELESS SENSOR ARCHITECTURE FOR INTERNET OF THINGS

RELATED APPLICATIONS

This application claims priority to Taiwan Application Serial Number 111142656, filed Nov. 8, 2022, which is herein incorporated by reference in its entirety.

BACKGROUND

Field of Invention

The disclosure relates to a modular wireless sensor system for Internet of things (IoT). More particularly, the disclosure relates to a assemblable modular IoT sensor system.

Description of Related Art

Generally, Internet of things (IoT) describes things or objects capable for connecting to a network. In addition, Internet of things nowadays is further referred to interconnected devices embedded with sensors, software and other techniques for informing user or executing automated actions.

However, there may require configuring different sensing devices at a detection location to measure the desired sensing data from an environment, in which the configuration of transmission lines for transmitting sensing data is usually designed according to the different data transmission protocols of the various sensing devices and corresponding communication circuit.

In certain cases, it is hard to replace or add the additional sensing devices by user, which is inconvenient for user and lacks the flexibility in application.

Therefore, how to provide a system to solve the above problems is an important issue in this field.

SUMMARY

To solve the above mentioned issues, the present disclosure provides a modular Internet of Things (IoT) sensor system including a network module and a first expanded sensor module. The network module includes a first female connector and a second female connector respectively disposed in two connection surfaces of the network module. The first female connector and the second female connector are in shape and size conforming to a universal serial bus type-C specification. A pin definition of the first female connector of the network module is complied with a first pin definition different from a pin definition of the universal serial bus type-C specification. The first expanded sensor module includes a male connector, a female connector and a sensor. The male connector and the female connector are respectively disposed in two connection surfaces of the first expanded sensor module. The male connector of the first expanded sensor module is configured to detachably connect to the first female connector of the network module. The male connector and the female connector are in shape and size conforming to the universal serial bus type-C specification. Pin definitions of the male connector and the female connector are complied with the first pin definition. The sensor is electrically connected between the male connector and the female connector. The sensor transmits sensing data through the male connector and the female connector.

Another embodiment of the disclosure provides a modular IoT sensor system for Internet of things including a network module, a first expanded sensor module and a second expanded sensor module. The network module includes a first female connector and a second female connector respectively disposed in two connection surfaces of the network module. The first female connector and the second female connector of the network module are in shape and size conforming to a universal serial bus type-C specification. A pin definition of the first female connector of the network module is complied with a first pin definition different from a pin definition of the universal serial bus type-C specification. The first expanded sensor module includes a male connector, a female connector and a sensor. The male connector and the female connector are respectively disposed in two connection surfaces of the first expanded sensor. The male connector of the first expanded sensor module is configured to detachably connect to the first female connector of the first communication connector. The male connector and the female connector are in shape and size conforming to the universal serial bus type-C specification. Pin definitions of the male connector and the female connector of the first expanded sensor module are complied with the first pin definition. The sensor is electrically connected between the male connector and the female connector. The sensor transmits sensing data through the male connector and the female connector. The second expanded sensor module includes a male connector and a female connector respectively disposed in two connection surfaces of the second expanded sensor. The male connector of the second expanded sensor module is configured to detachably connect to the female connector of the first expanded sensor module. The male connector and the female connector of the second expanded sensor module are in shape and size conforming to the universal serial bus type-C specification. Pin definitions of the male connector and the female connector of the second expanded sensor module are complied with the first pin definition.

The other embodiment of the disclosure provides a modular IoT sensor system including a network module, a first expanded sensor module and a power module. The network module includes a first female connector and a second female connector respectively disposed in two connection surfaces of the network module. The first female connector and the second female connector of the network module are in shape and size conforming to a universal serial bus type-C specification. A pin definition of the first female connector is complied with a first pin definition. A pin definition of the second female connector is complied with a second pin definition. The first pin definition and the second pin definition are different from a pin definition of the universal serial bus type-C specification. The first expanded sensor module includes a male connector, a female connector and a sensor. The male connector and the female connector are respectively disposed in two connection surfaces of the first expanded sensor. The male connector of the first expanded sensor module is configured to detachably connect to the first female connector of the network module. The male connector and the female connector of the first expanded sensor module are in shape and size conforming to the universal serial bus type-C specification. Pin definitions of the male connector and the female connector of the first expanded sensor module are complied with the first pin definition. The sensor is electrically connected between the male connector and the female connector. The sensor transmits sensing data through the male connector and the female connector. The power module includes a male connector and a female connector respectively disposed in two connection surfaces of the power module. The power module is configured to generate and supply a power. The male connector of the power module is configured to detachably connect to the second female connector of the network module. The male connector and the female connector are in shape and size conforming to universal serial bus type-C specification. Pin definitions of the male connector and the female connector are complied with the second pin definition.

Summary, the present disclosure is to provide an expanded sensor module including a male connector and a female connector, and pin definitions thereof are complied with a first pin definition. The present disclosure is further to provide a network module including a female connector, and a pin definition thereof is complied with the first pin definition. On the basis of the configuration of the first pin definition, the expanded sensor module is capable for transmitting sensing data to the network module through the corresponding connectors.

BRIEF DESCRIPTION OF THE DRAWINGS

The disclosure can be more fully understood by reading the following detailed description of the embodiment, with reference made to the accompanying drawings as follows:

FIG. 4A and FIG. 4B are schematic diagrams illustrating a first pin definition according to some embodiments of the present disclosure.

FIG. 9A and FIG. 9B are schematic diagrams illustrating a second pin definition according to some embodiments of the present disclosure.

DETAILED DESCRIPTION

Reference is now made in detail to the present embodiments of the disclosure, examples of which are illustrated in the accompanying drawings. The embodiments below are described in detail with the accompanying drawings, but the examples provided are not intended to limit the scope of the disclosure covered by the description. The structure and operation are not intended to limit the execution order. Furthermore, for simplifying the diagrams, some of the conventional structures and elements are shown with schematic illustrations. Any structure regrouped by elements, which has an equal effect, is covered by the scope of the present disclosure.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another.

Figure 1:
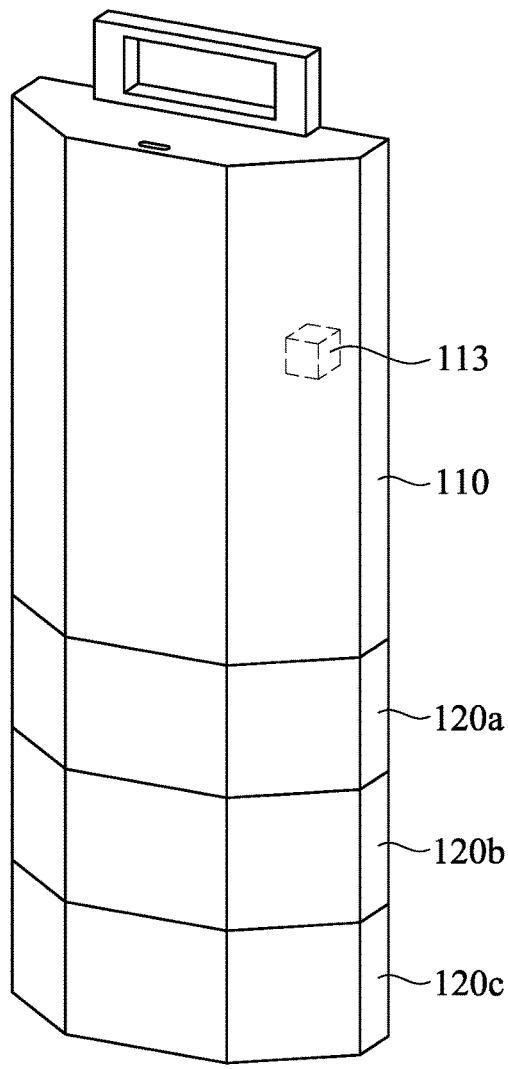
FIG. 1 is a schematic diagram illustrating a modular Internet of Things (IoT) sensor system according to some embodiments of the present disclosure.

Reference is made to FIG. 1. FIG. 1 is a schematic diagram illustrating a modular Internet of Things (IoT) sensor system 100 according to some embodiments of the present disclosure. In some embodiments of the present disclosure, the modular IoT sensor system 100 includes a network module 110 and expanded sensor modules 120a~120c.

The expanded sensor modules 120a~120c are configured to detect information in an environment to generate sensing data, the said information can be physical quantity (such as, light intensity, temperature, humidity, pressure or other physical properties) or chemical composition (such as, carbon monoxide, sulfur dioxide, hydrogen sulfide, ammonia or other chemical compositions). And, the expanded sensor modules 120a~120c transmit the sensing data to the network module 110.

The network module 110 is configured to collect the sensing data generated by the expanded sensor modules 120a~120c by detecting the information in the environment, so as to process the sensing data and send the sensing data to the cloud database. In some embodiments, the network module 110 includes an integration of one or more processing circuit (such as, central processing unit (CPU), graphic processing unit (GPU), microcontroller or other circuit capable with data processing/calculating functions) and wireless communication circuit (such as, Wi-Fi communication, Internet of Things communication circuit, LTE-machine to machine communication circuit, long range communication circuit, narrow board Internet of Things communication circuit, communication circuit which supports fourth/fifth-generation technology standard, Bluetooth communication circuit, Zigbee communication circuit or other communication circuit). The said processing circuit and the said communication circuit can operate with appropriate software/firmware to collect the sensing data, generated by detecting the information in the environment by the expanded sensor modules 120a~120c, and to convert the sensing data into a data format for wireless communication transmission, so as to send the sensing data to the cloud database through the wireless communication.

In some embodiments, the network module 110 can further include an energy storage component 113. Specifically, the energy storage component 113 can be implemented by a secondary battery, so as to store electrical energy and provide the power to the inner circuit (such as, the aforesaid processing circuit and the said communication circuit) of the network module 110 and the expanded sensor module 120a~120c.

Structurally, the expanded sensor modules 120a~120c can be stacked and coupled to the network module 110 and/or can be stacked and coupled to each other like building blocks. The connection of the said stacking and coupling can be detachably stacked connection, to reduce difficulties of replacing the sensing devices into the modular IoT sensor system 100 for user. As such, user can conveniently replace the expanded sensor module 120a~120c or add addition expanded sensor modules into the modular IoT sensor system 100 according to the desired detection information in the environment at the location.

Although the embodiments in FIG. 1 illustrates multiple expanded sensor modules 120a~120c, the expanded sensor module(s) included in the modular IoT sensor system 100 can be configured according to the requirement of the detection place, and therefore the number of the expanded sensor module(s) included in the modular IoT sensor system 100 can be any positive integer, the present disclosure is not limited thereto.

Figure 2:
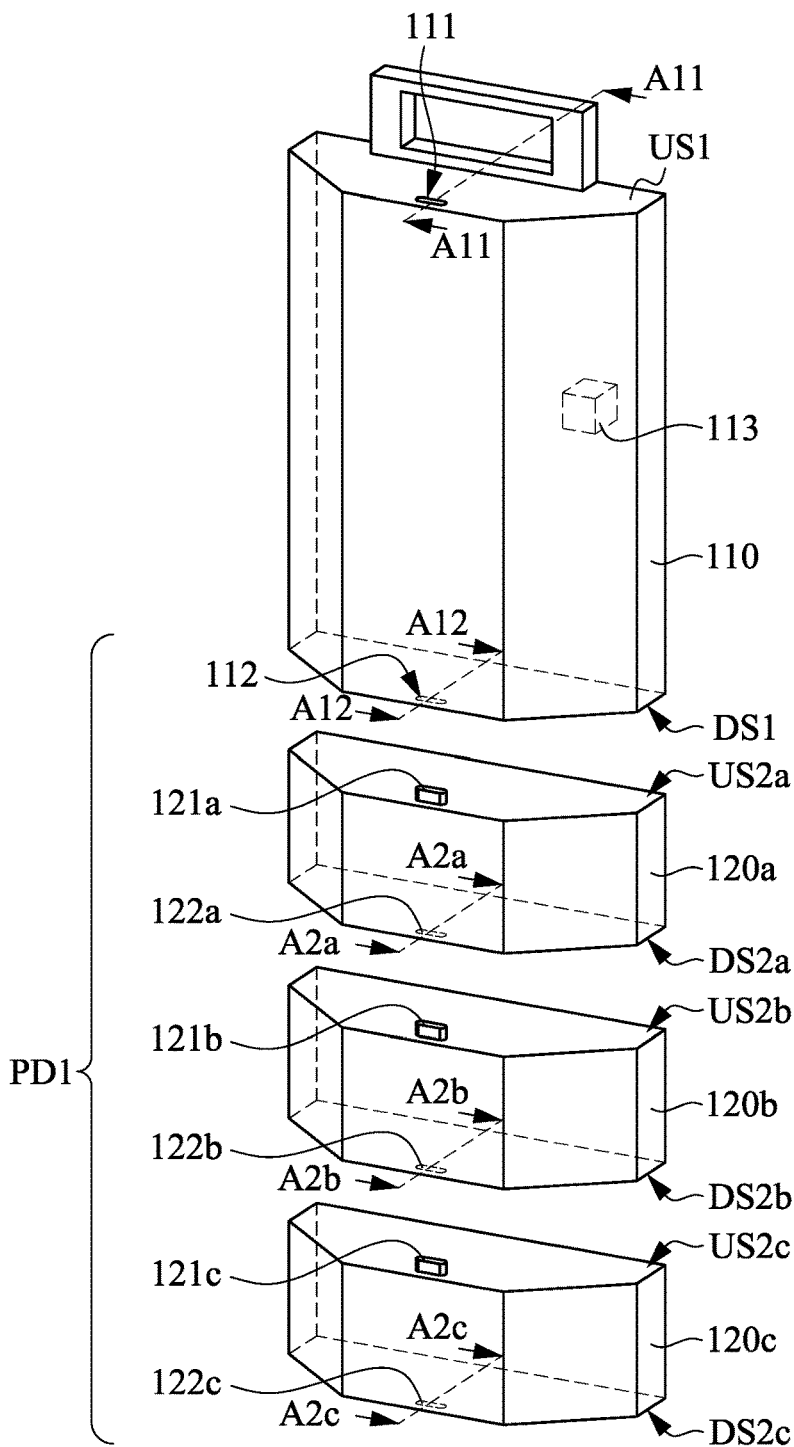
FIG. 2 is a schematic diagram illustrating a part drawing of a modular IoT sensor system according to some embodiments of the present disclosure.

Reference is made to FIG. 1 and FIG. 2. FIG. 2 is a schematic diagram illustrating a part drawing of a modular IoT sensor system 100 according to some embodiments of the present disclosure. As shown in FIG. 2, the network module 110 includes female connectors 111 and 112 are respectively disposed in opposite sides of a main body of the network module 110. The female connectors 111 and 112 are respectively disposed in connection surfaces US1 and DS1 of the network module 110. The connection surfaces US1 is an upper surface of a shell of the network module 110, and the connection surfaces DS1 is a bottom surface of the shell of the network module 110. In some embodiments, the aforesaid shell of the network module 110 is a hollow building block.

The connection surfaces US1 and DS1 of the network module 110 are linear symmetric in shape (such as, triangle, quadrangle, pentagon, hexagon or octagon in shape), and have symmetrical axes A11, A12, respectively. The symmetrical axis A11 of the connection surface US1 pass through the female connector 111. The symmetrical axis A12 of the connection surface DS1 pass through the female connector 112. In certain case, even if the connection surfaces US1 and/or DS1 of the network module 110 are not staked with the other module, upper side and bottom side of the main body of the network module 110 including the female connectors 111 and 112 instead of any protruding connector, in order to increase the utilization of the connection surface US1 of the network module 110 and to increase the stability of the modular IoT sensor 100. Therefore, when the expanded sensor module 120a is directly combined to the network module 110 by connecting the male connector 121a to the female connector 112, the entire mechanical structure is better and the expanded sensor module 120a is hard to fall off the network module 110 causing by the unbalance force.

The expanded sensor module 120a includes a male connector 121a and a female connector 122a disposed in the opposite sides of a main body of the expanded sensor module 120a. The male connector 121a is disposed in the connection surface US2a of the expanded sensor module 120a, and the male connector 121a is configured to detachably connect to the female connector 112 of the network module 110. The female connector 122a is disposed in the connection surface DS2a of the expanded sensor module 120a. The connection surfaces US2a and DS2a are in the same shape and are parallel to each other. The connection surfaces US2a is an upper surface of a shell of the expanded sensor module 120a, and the connection surfaces DS2a is a bottom surface of the shell of the expanded sensor module 120a. In some embodiments, the aforesaid shell of the expanded sensor module 120a is a hollow building block.

In some embodiments, the connection surfaces US2a and DS2a are in symmetric shapes (such as, triangle, quadrangle, pentagon, hexagon or octagon in symmetric) in respect to the symmetrical axis A2a, and the configurations of the male connector 121a and the female connector 122a are on a basis of symmetrical axis A2a. In certain case, even if the bottom side of the expanded sensor module 120a is not staked with the other module, the connection surface DS2a of the expanded sensor module 120a including the female connector 122a instead of any protruding connector, in order to increase the stability of the modular IoT sensor 100.

The expanded sensor module 120b includes a male connector 121b respectively disposed in connection surfaces US2b and DS2b of the expanded sensor module 120b, in which the connection surfaces US2b and DS2b are in the same shape and are parallel to each other. The connection surfaces US2b is an upper surface of a shell of the expanded sensor module 120b, and the connection surfaces DS2b is a bottom surface of the shell of the expanded sensor module 120b. In some embodiments, the aforesaid shell of the expanded sensor module 120b is a hollow building block. The expanded sensor module 120c includes a male connector 121c respectively disposed in connection surfaces US2c and DS2c of the expanded sensor module 120c, in which the connection surfaces US2c and DS2c are in the same shape and are parallel to each other. The connection surfaces US2b is an upper surface of a shell of the expanded sensor module 120b, and the connection surfaces DS2b is a bottom surface of the shell of the expanded sensor module 120b. In some embodiments, the aforesaid shell of the expanded sensor module 120b is a hollow building block.

In some embodiments, the male connector 121b of the expanded sensor module 120b is configured to detachably connect to the female connector 122a of the expanded sensor module 120a. The male connector 121c of the expanded sensor module 120c is configured to detachably connect to the female connector 122b of the expanded sensor module 120b.

The shape and the structure of the expanded sensor modules 120b and 120c are similar with the expanded sensor module 120a. And, the configurations of the male connector 121b and the female connector 122b included in the expanded sensor module 120b and the male connector 121c and the female connector 122c included in the expanded sensor module 120c are similar with the male connector 121a and the female connector 122a included in the expanded sensor module 120a, and the description is omitted herein.

In some embodiments, the connection surface DS12 of the network module 110 and the connection surfaces US2a~US2c and DS2a~DS2c of the expanded sensor modules 120a~120c are almost the same in shape and area, so that the network module 110 and the expanded sensor module 120a~120c are capable for staking together like building blocks.

To be noted that, the female connector 112 included in the network module 110 and the male connectors 121a~121c and the female connectors 122a~122c included in the expanded sensor module 120a~120c are in shape and size confirming the universal serial bus type C specification. The pin definitions of the female connector 112 included in the network module 110 and the male connectors 121a~121c and the female connectors 122a~122c included in the expanded sensor modules 120a~120c are complied with the first pin definition PD1 which redefines a portion of pins in the universal serial bus type C specification. The configuration of the first pin definition PD1 will be described in detailed in the following embodiments.

Figure 3:
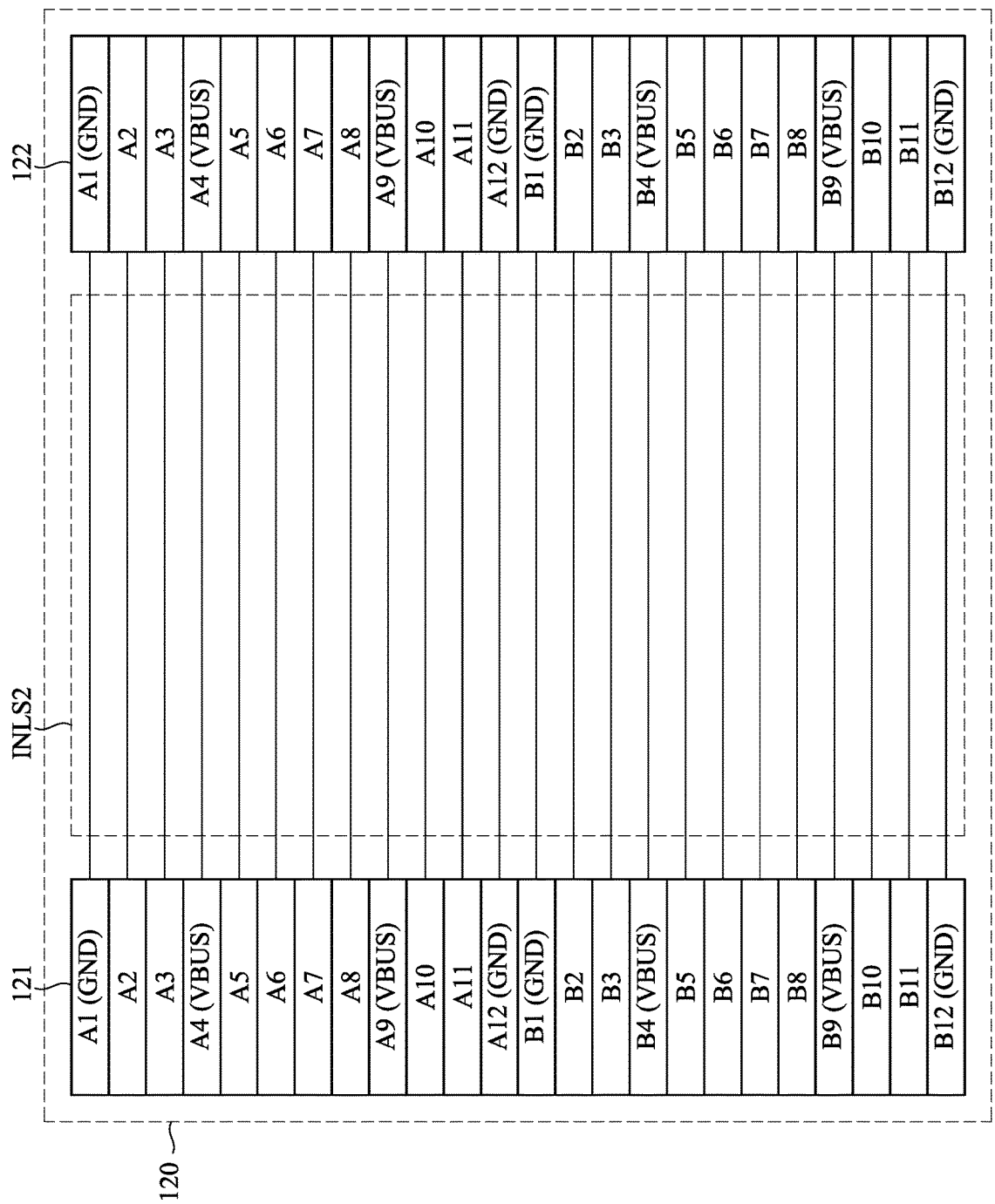
FIG. 3 is a schematic diagram illustrating a male connector connected through internal connection lines to a female connector of an expanded sensor module according to some embodiments of the present disclosure.

Reference is made to FIG. 1 to FIG. 3. FIG. 3 is a schematic diagram illustrating a male connector 121 connected through internal connection lines INLS2 to a female connector 122 of an expanded sensor module 120 according to some embodiments of the present disclosure. The connection relationships between the male connectors 121a~121c and the corresponding female connectors 122a~122c included in the expanded sensor modules 120a~120c in the embodiments of FIG. 1 and FIG. 2 are similar with/equal to the connection relationship between the male connector 121 and the female connector 122 included in the expanded sensor module 120 in the embodiments of FIG. 3. In some embodiments, the internal connection lines INLS2 of the expanded sensor module 120 corresponding to the internal connection lines included in each of the expanded sensor modules 120a and 120b.

As shown in FIG. 3, the expanded sensor module 120 includes a male connector 121, a female connector 122 and multiple internal connection lines INLS2. Each of the pins A1~A12 and B1~B12 of the male connector 121 has a one-to-one correspondence with a corresponding one of the pins A1~A12 and B1~B12 of the male connector 121. Each of the pins A1~A12 and B1~B12 of the male connector 121 is one-to-one connected to a corresponding one of the pins A1~A12 and B1~B12 of the male connector 121 through the internal connection lines INLS2. Specifically, the pin A1 of the male connector 121 is connected to the pin A1 of the female connector 122 through an internal connection line. The pin A2 of the male connector 121 is connected to the pin A2 of the female connector 122 through another internal connection line. The pin A3 of the male connector 121 is connected to the pin A3 of the female connector 122 through another internal connection line, and so on.

Each of the male connector 121 and the female connector 122 includes a power pin set which includes ground pins GND and bus power pins VBUS. The ground pins GND and bus power pins VBUS are respectively configured in the pins A1, A4, A9, A12, B1, B4, B9, B12 included in each of the male connector 121 and the female connector 122. The said power pin set confirms the universal serial bus type C specification. The other pins of the male connector 121 and the female connector 122 are redefined to be different from the universal serial bus type C specification.

Reference is made to FIG. 1 to FIG. 4A and FIG. 4B. FIG. 4A and FIG. 4B are schematic diagrams illustrating a first pin definition PD1 according to some embodiments of the present disclosure. As shown in FIG. 4A, the first pin definition PD1 includes the power pin set, the shared pin sets SPG1~SPG3 and the non-shared pin sets PDG and PAG.

The power pin set is configured to provide power and grounding path. Each of the shared pin sets SPG1~SPG3 is capable for transmitting sensing data generated from various sensors or multiple modules through a shared portion of internal connection lines. In other words, each of the shared pin sets SPG1~SPG3 is capable for transmitting sensing data confirming the same data transmission protocol generated from various sensors or multiple modules through the same internal connection lines. Each of the non-shared pin sets PDG and PAG is capable for transmitting sensing data generated from a single/dedicated sensor through a non-shared portion of internal connection lines.

As shown in FIG. 4B, the power pin set includes the ground pins GND and bus power pins GND which are respectively configured in pins A1, A4, A9, A12, B1, B4, B9 and B12. The aforesaid power pin set is equal to/similar with the power pin set in the embodiments of FIG. 3, and the description is omitted herein.

The shared pin set SPG1 includes a serial clock pin ISC_CLK and a serial data pin ISC_SDA. As such, the sensor including the I2C pins in the modular IoT sensor 100 can transmit the sensing data conforming to the I2C protocol by the shared pin set SPG1.

The shared pin set SPG2 includes a serial clock pin SPI_CLK, a master output pin SPI_MOSI, a salve output pin SPI_MISO and a slave select pin SPI_CLI. As such, the sensor including the SPI pins in the modular IoT sensor 100 can transmit the sensing data conforming to the SPI protocol by the shared pin set SPG2.

The shared pin set SPG3 includes the data send/receive pin UART+ and the data receive/send pin UART−. As such, the sensor including the UART pins in the modular IoT sensor 100 can transmit the sensing data conforming to the RS485 specification by the shared pin set SPG3.

In some other embodiments, the shared pin set SPG3 can be configured to transmit the electrical signal confirms the RS232 specification, which is not intended to limit the present disclosure.

The non-shared pin set PDG includes the digital data input/output pins DIN/DOUT1~DIN/DOUT4 and the digital data input/output pin DIN/DOUT1~DIN/DOUT4 which are to transmit the sensing data generated form the single/dedicated sensor included in the modular IoT sensor 100. In some embodiments, the non-shared pin set PDG can be considered as non-shared digital data pin set.

The non-shared pin set PAG includes the analog data input pins AIN1~AIN3 and the analog data output pin AOUT, the corresponding one of which is to transmit the sensing data generated from a single/dedicated sensor/module included in the modular IoT sensor 100. In some embodiments, the non-shared pin set PAG can be considered as non-shared analog data pin set.

To integrate the aforementioned signal transmission protocol in various type, in the modular IoT sensor 100, pin definitions of the female connector 112 disposed in the bottom surface DS1 of the network module 110 and the male connectors 121a~121c and the female connectors 122a~122c respectively disposed in the expanded sensor modules 120a~120c are implemented by the first pin definition PD1. When the expanded sensor module 120a~120c and the network module 110 are stacked and mechanically connected together, the expanded sensor module 120a~120c are electrically and connected in series by the corresponding male connectors 121a~121c and female connectors 122a~122c, and the male connector of first one of the expanded sensor module 120a~120c is electrically connected to the female connector 112 of the network module 110.

As such, the network module 110 is capable for receiving electrical signals in varies type through the male connectors 121a~121c and the female connectors 122a~122c of the expanded sensor modules 120a~120c, in order to integrate the different data transmission protocols of sensors in varies types to the modular IoT sensor 100.

Although the embodiments in FIG. 4A and FIG. 4B illustrates multiple shared pin sets SPG1~SPG3 and multiple non-shared pin sets PDG and PAG, the shared pin set and the non-shared pin set in the first pin definition PD1 can be configured according to the requirement for the whole system, so that the number of the shared pin set and/or the number of the non-shared pin set in the first pin definition PD1 can be any positive integer, the present disclosure is not limited thereto.

Figure 5:
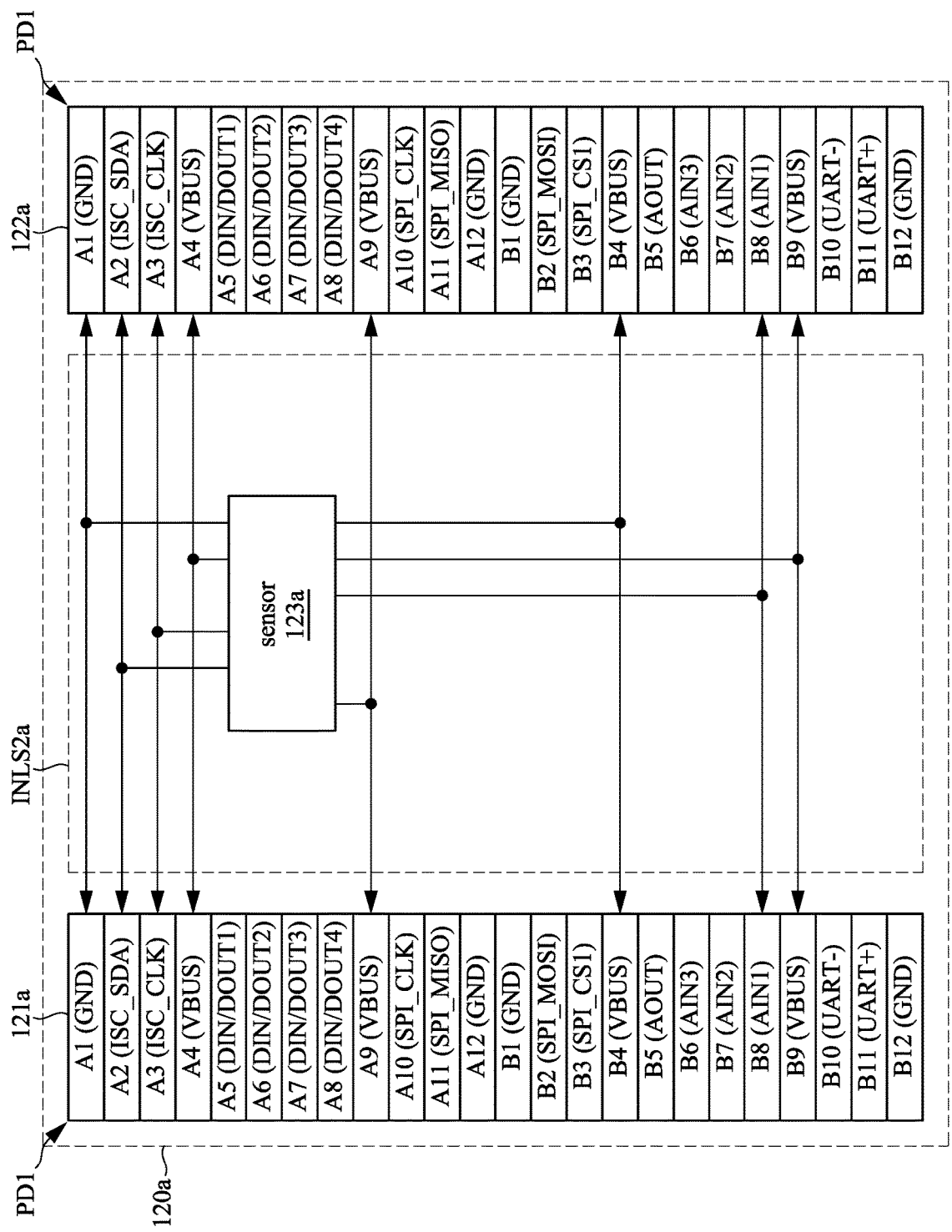
FIG. 5 to FIG. 7 are schematic diagrams illustrating transmission of sensing data of sensors through a male connector and a female connector of expanded sensor modules according to some embodiments of the present disclosure.
Figure 6:
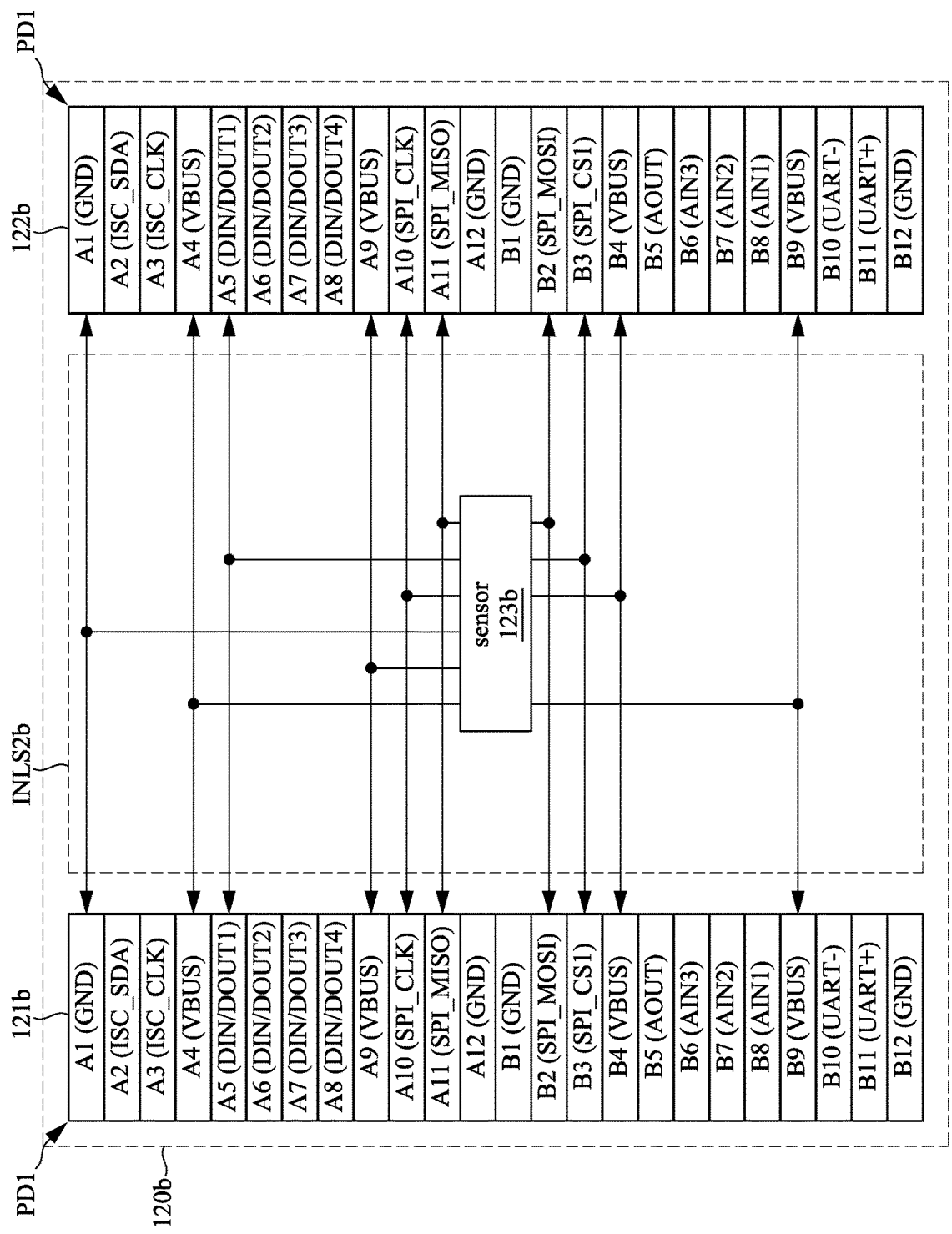
Figure 7:
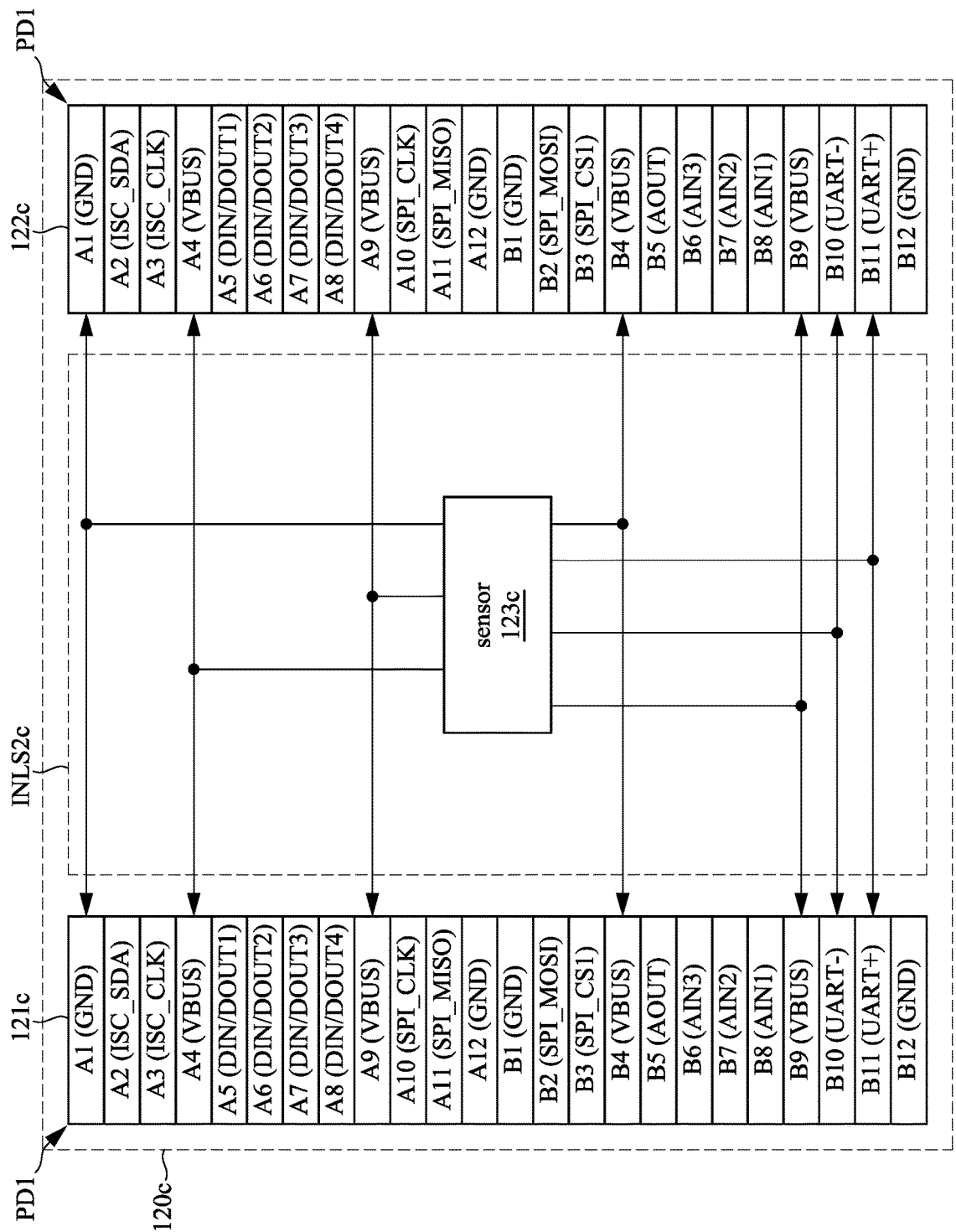

To better understanding, reference is made to FIG. 1 to FIG. 7. FIG. 5 to FIG. 7 are schematic diagrams illustrating transmission of sensing data of sensors 123a~123c through a male connectors 121a~121c and a female connectors 122a~122c of expanded sensor modules 120a~120c under a specification of the first pin definition PD1 according to some embodiments of the present disclosure.

To be noted that, each of the expanded sensor modules 120a~120c includes internal connection lines. The connection relationship of the internal connection lines in each of the internal connection lines corresponds to the connection relationship of the internal connection lines INLS2 connected between the male connector 121 and the female connector 122 of the expanded sensor module 120 in the FIG. 3. Specifically, internal connection lines included in the expanded sensor modules 120a connect pins of the male connector 121a to pins of the female connector 122a on a basis of a one-to-one correspondence between each pins of the male connector 121a and each pins of the female connector 122a. Internal connection lines included in the expanded sensor modules 120b connect pins of the male connector 121b to pins of the female connector 122b on a basis of a one-to-one correspondence between each pin of the male connector 121b and a corresponding pin of the female connector 122b. Internal connection lines included in the expanded sensor modules 120c connect pins of the male connector 121c to pins of the female connector 122c on a basis of a one-to-one correspondence between each pin of the male connector 121c and a corresponding pin of the female connector 122c.

To clarity, embodiments of FIG. 5 to FIG. 7 only show a portion of the internal connection lines INLS2. In some embodiments, each pin of the male connectors 121a is one-to-one connected to a corresponding pin of the male connectors 121a. Each pin of the male connectors 121b is one-to-one connected to a corresponding pin of the male connectors 121b. Each pin of the male connectors 121c is one-to-one connected to a corresponding pin of the male connectors 121c.

As shown in FIG. 5, the expanded sensor module 120a includes a male connector 121a, a female connector 122a and a sensor 123a. The sensor 123a is supposed to include I2C pins and analog data pin, the sensor 123a is electrically coupled to internal connection lines INLS2a which are a portion of the internal connection lines INLS2. The internal connection lines INLS2 connect the sensor 123a to the power pin set (the ground pins GND and the bus power pins VBUS), the shared pin set SPG1 (the serial clock pin ISC_CLK and the serial data pin ISC_SDA) and the analog input pin AIN included in the non-shared pin set PAG.

Therefore, the sensor 123a of the expanded sensor module 120a can receive the power supplied from the energy storage component 113 of the network module 110 by the power pin set of the male connector 121a. The sensor 123a of the expanded sensor module 120a uses the electrical signals confirm I2C protocol for transmitting sensing data to the network module 110 by the shared pin set SPG1 of the male connector 121a. And, the sensor 123a of the expanded sensor module 120a can transmit the analog signal to through the analog input pin AIN of the male connector 121a to the network module 110.

As shown FIG. 6, the expanded sensor module 120b includes a male connector 121b, a female connector 122b and a sensor 123b. The sensor 123b is supposed to include SPI pins and digital data pins. The sensor 123b is electrically coupled to internal connection lines INLS2b which are a portion of the internal connection lines INLS2. The internal connection lines INLS2b connect the sensor 123b to the power pin set (the ground pins GND and bus power pins VBUS), the shared pin set SPG2 (the serial clock pin SPI_CLK, the master output pin SPI_MOSI, the salve output pin SPI_MISO and the slave select pin SPI_CLI) and the digital data input/output pin DIN1 included in the non-shared pin set PDG.

Therefore, the sensor 123b of the expanded sensor module 123b can receive the power supplied from the energy storage component 113 of the network module 110 by the power set of the male connector 121b. The sensor 123b of the expanded sensor module 123b uses electrical signals confirm the SPI protocol for transmitting sensing data to the network module 110 by the shared pin set SPG2 included in each of the male connector 121b of the expanded sensor module 120b and the female connector 122a and the male connector 121a of the expanded sensor module 120a. And, the sensor 123b of the expanded sensor module 123b can transmit the digital signals to the network module 110 through the digital output/input pin DIN/DOUT1 included in each of the male connector 121b of the expanded sensor module 120b and the female connector 122a and the male connector 121a of the expanded sensor module 120a.

As shown in FIG. 7, the expanded sensor module 120c includes a male connector 121c, a female connector 122c and a sensor 123c. The sensor 123c is supposed to include UART pins. The sensor 123c is electrically coupled to internal connection lines INLS2c which are a portion of the internal connection lines INLS2. The internal connection lines INLS2 connect the sensor 123c to the power pin set (the ground pins GND and the bus power pins VBUS) and the shared pin set SPG3 (the data send/receive pin UART+, and the data receive/send pin UART−).

Therefore, the sensor 123c of the expanded sensor module 120c can receive the power supplied from the energy storage component 113 of the network module 110 through the power pin set of the male connector 121c. The sensor 123c of the expanded sensor module 120c uses electrical signals which confirm RS485 protocol for transmitting sensing data to the network module 110 through the shared pin set SPG3 included in each of the female connector 122c of the expanded sensor module 120c, the female connector 122b and the male connector 121b of the expanded sensor module 120b, the female connector 122a and the male connector 121a of the expanded sensor module 120a to the network module 110.

In the aforementioned embodiments, each of the sensors 123a~123c can be implemented by an image sensor, a temperature sensor, a humidity sensor, a gas detection sensor, a distance sensor, a pressure sensor, a human body infrared sensor, an acceleration sensor, a sound sensor, a soil moisture sensor, a gas sensor, a displacement sensor or the other sensor, which is not intended to limit the present disclosure.

In some embodiments, the expanded sensor modules 120a~120c can further include one or more switches, such as, relay (not shown), for activing the corresponding device (such as, the said sensor in the present disclosure). In actual application, user can uses the mobile phone (such as, the smart phone) to transmit the cloud control signal to the network module 110, and the network module 110 can commute the said switch to active the corresponding device.

In some embodiments, the configuration of the first pin definition PD1 has a rotational symmetry. That is, the configuration of pins A1~A12 of the first pin definition PD1 and the configuration of pins B1~B12 of the first pin definition PD1 are symmetry, and the expanded sensor modules 123a~123c and the network module 110 are electrically and mechanically connected and are relatively rotatable.

Figure 8:
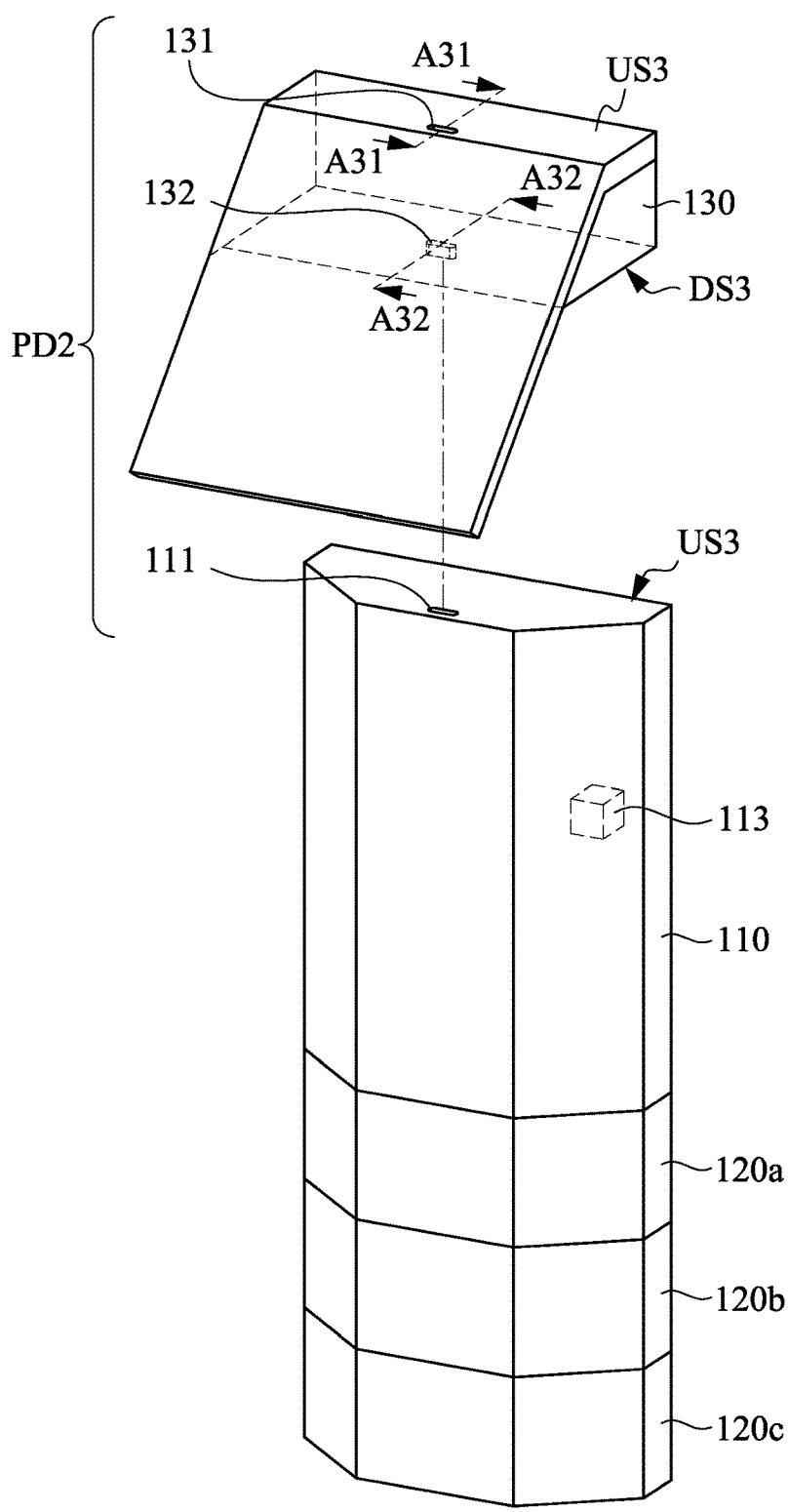
FIG. 8 is a schematic diagram illustrating a modular IoT sensor system according to some embodiments of the present disclosure.

Reference is made to FIG. 8. FIG. 8 is a schematic diagram illustrating a modular IoT sensor 100 for Internet of things according to some embodiments of the present disclosure. In the embodiments of FIG. 8, the modular IoT sensor 100 further includes a power module 130.

The power module 130 is detachably coupled to the network module 110, the power module 130 is configured to obtain energy from the environment and convert the energy to the power. The power module 130 provide the power to the network module 110 to store/utilization, so as to provide the power generated by the power module 130 to the expanded sensor module 120a~120c from the network module 110.

The power module 130 includes the female connector 131 and the male connector 132 disposed in the opposite sides of a main body of the power module 130, in which the female connector 131 is disposed in a connection surface US3 of a shell of the power module 130, and the male connector 132 is disposed in a connection surface DS3 of the shell of power module 130. The connection surfaces US3 is an upper surface of a shell of the power module 130, and the connection surfaces DS3 is a bottom surface of the shell of the power module 130. In some embodiments, the aforesaid shell of the power module 130 is a hollow building block. The connection surfaces US3 and DS3 of the power module 130 are in linear symmetric in shape (such as, triangle, quadrangle, pentagon, hexagon or octagon in shape), and have symmetrical axes A31, A31, respectively. The symmetrical axis A31 passes through the female connector 131. The symmetrical axis A32 passes through the male connector 132.

The female connector 131 and the male connector 132 of the power module 130 and the female connector 111 of the network module 110 are in shape and size which are confirm to the universal serial bus type C specification.

To be noted, pin definitions of the female connector 131 and the male connector 132 of the power module 130 and the female connector 111 of the network module 110 are complied with a second pin definition PD2 which is to redefine a portion of pins in the universal serial bus type C specification, and the second pin definition PD2 is different from the aforesaid first pin definition PD1. The second pin definition PD2 will be described in detailed in the following embodiments.

Reference is made to FIG. 1 to FIG. 9B. FIG. 9A and FIG. 9B are schematic diagrams illustrating a second pin definition PD2 according to some embodiments of the present disclosure. As shown in FIG. 9A, the second pin definition PD2 includes a power pin set, shared pin sets SPG31~SPG32, non-shared pin sets PDG and PAG and a power interface pin set PCIG.

The power pin set is configured to provide power and grounding path. Each of the shared pin sets SPG31~SPG32 is capable for transmitting sensing data generated from various sensors or multiple modules through a shared portion of internal connected lines. In other words, each of the shared pin sets SPG31~SPG32 is capable for transmitting sensing data confirming the same data transmission protocol generated from various sensors or multiple modules through the same internal connection lines. Each of the non-shared pin sets PDG and PAG is capable for transmitting sensing data generated from a single/dedicated sensor/module by a non-shared portion of the internal connected lines.

Although the embodiments of FIG. 9A illustrate multiple shared pin sets SPG31~SPG32 and non-shared pin sets PDG and PAG, the shared pin set and the non-shared pin set included in the second pin definition PD2 can be configured on a basis of the requirement for entire system, so the number of the shared pin set and/or the number of the non-shared pin set in the second pin definition PD2 can be any positive integer, the present disclosure is not limited thereto.

As shown in FIG. 9B, the power pin set include the ground pins GND and bus power pins VBUS which are disposed in pins A1, A4, A9, A12, B1, B4, B9 and B12, respectively, the said power pin set corresponding to the power pin set in the embodiment of FIG. 3, and the description is omitted here.

The shared pin sets SPG31 and SPG32 include the data send/receive pins UART1+ and UART2+ and the data receive/send pins UART1− and UART2−. As such, device(s) staked up on the upper side of the network module 110 and including UART pins can use the electrical signal confirm UART protocol for transmitting data through the shared pin set SPG31 or SPG32.

The non-shared pin set PDG includes digital data input/output pins DIN/DOUT1~DIN/DOUT4 which are configured to provide data transmission path for the dedicated sensor/module stacked on the upper side of the network module 110. In some embodiments, the non-shared pin set PDG can be considered as non-shared digital data pin set.

The non-shared pin set PAG includes analog data input pins AIN1~AIN3 and an analog data output pin AOUT. At least one of the analog data input pins AIN1~AIN3 and the analog data output pin AOUT is configured to transmit data generated from a single/dedicated sensor/device stacked on the upper side of the network module 110. In some embodiments, the non-shared pin set PAG can be considered as non-shared analog data pin set.

The power interface pin set PCIG includes a positive pin of input voltage VIN+, a negative pin of input voltage VIN−, a battery voltage pin VBAT and a reference voltage pin VS which are configured in pins A10, A11, B2 and B3 included in each of the female connector 131 and the male connector 132.

In the modular IoT sensor 100, pin definitions of the female connector 111 disposed in the connection surface US1 of the network module 110, the female connector 131 and the male connector 132 respectively disposed in the connection surfaces US3 and DS3 of the power module 130 are implemented by the second pin definition PD2.

Figure 10:
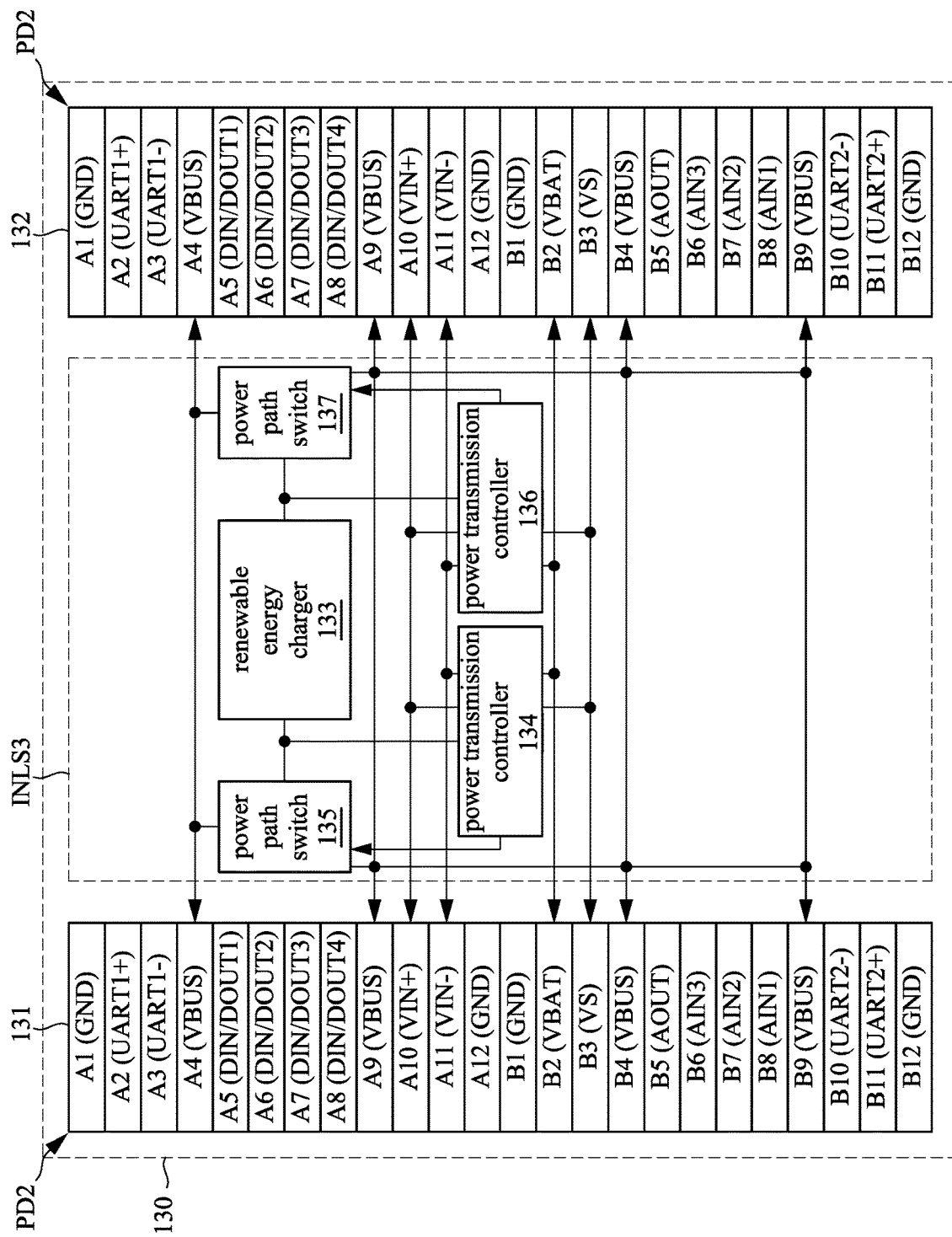
FIG. 10 is a schematic diagram illustrating transmission of power through female connector and male connector of the renewable emerge charger in power module according to some embodiments of the present disclosure.

Reference is made to FIG. 10. FIG. 10 is a schematic diagram illustrating transmission of power through female connector 131 and male connector 132 of the renewable emerge charger 133 in the power module 130 according to some embodiments of the present disclosure.

As shown in FIG. 10, the power module 130 includes a female connector 131, a male connector 132, a renewable energy charger 133, power path switches 135 and 137 and power transmission controllers 134 and 136.

The power module 130 includes internal connection lines INLS3. The internal connection lines INLS3 connect the power path switches 135 and 137 and power transmission controllers 134 and 136 to the power pin set and the power interface pin set PCIG included in each of the female connector 131 and the male connector 132.

The power transmission controllers 134 and 136 can control the power path switch 135 and/or the power path switch 137 to turn on or turn off the current paths between the renewable energy charger 133 to the power pin set (such as, the bus power pins VBUS included in each of the female connector 131 and the male connector 132). As such, when the male connector 132 of the power module 130 is connected to the female connector 111 of the network module 110, the network module 110 can receive the power generated by the renewable energy charger 133 from the female connector 111.

In some embodiments, the renewable energy charger 133 can be implemented by a thermoelectric power generation charger, a solar power generation charger, a microwave power generation charger, a wind power generation charger, a hydroelectric power generation charger or the other natural energy charger, which is not intended to limit the present disclosure.

Figure 11:
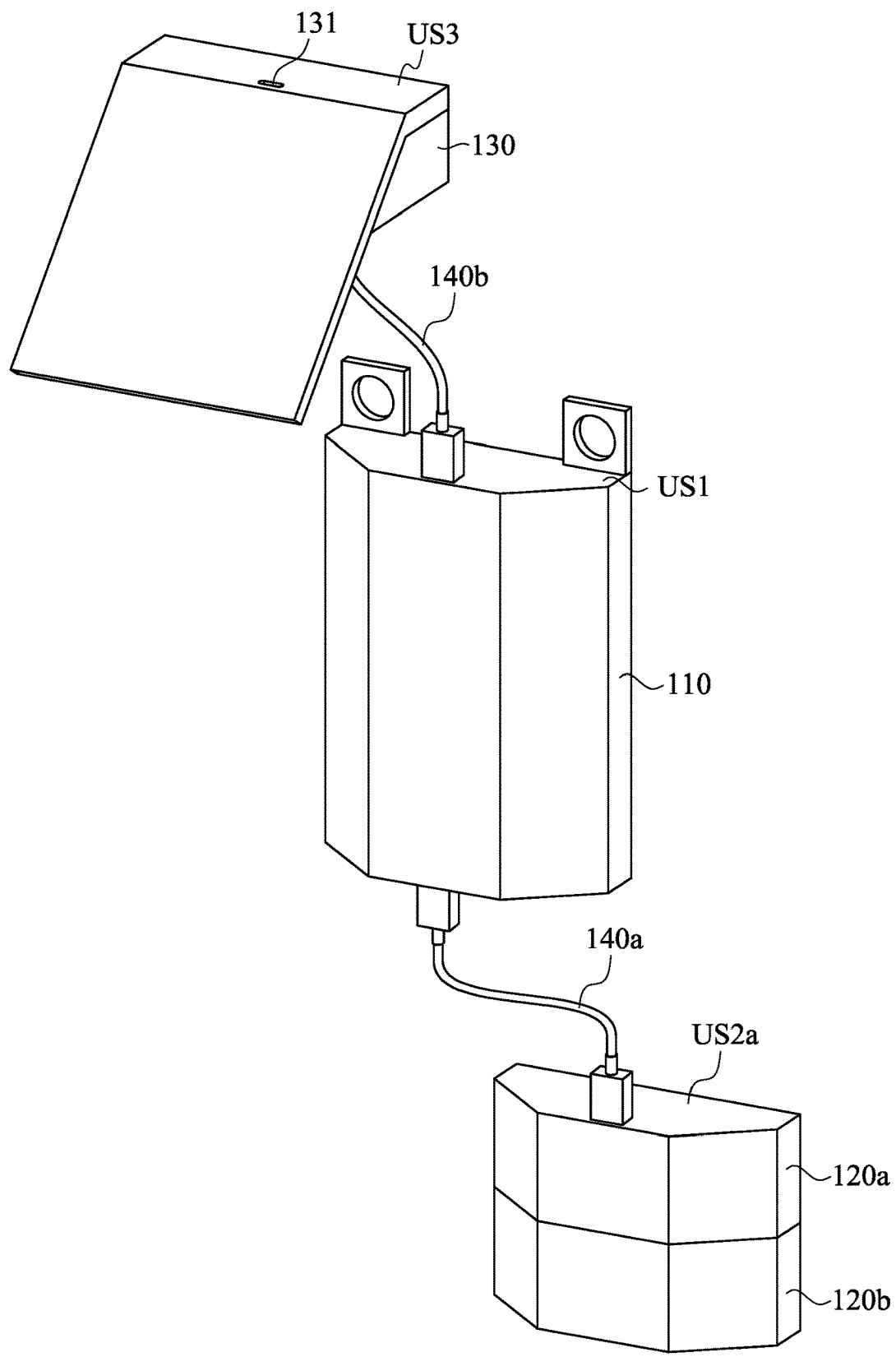
FIG. 11 is a schematic diagram illustrating a modular IoT sensor system according to some embodiments of the present disclosure.

Reference is made to FIG. 11. FIG. 11 is a schematic diagram illustrating a modular IoT sensor 100 for Internet of things according to some embodiments of the present disclosure. In some embodiments, the modular IoT sensor 100 further includes transmission lines 140a and 140b. The male connector 132 of the power module 130 is electrically coupled to the female connector 111 of the network module 110 by the transmission line 140b. The female connector 112 of the network module 110 is electrically connected to the male connector 121a of the expanded sensor module 120a by the transmission line 140a.

In certain cases, user can adjust the length of the transmission line 140b to control the separation distance between the network module 110 and the power module 130, such that the network module 110 and the power module 130 can be placed at the appropriate places, respectively, and maintain the connection between the network module 110 and the power module 130. That is, the network module 110 can be placed at a place with good communication signal. Therefore, the sensing data can be reliably sent to the cloud by placing the network module 110 at an appropriate place, and the electrical power can be reliably generated by placing the network module 110 at the other place. And, user can also adjust the length of the transmission line 140a to control the separation distance between the expanded sensor modules 120a~120c to move the expanded sensor module 120a~120c to the appropriate places.

Summary, the expanded sensor modules 120a~120c and the power module 130 of the modular IoT sensor 100 are staked to the bottom side and the upper side of the network module 110 like building blocks. The replacement of the expanded sensor modules 120a~120c and/or the addition of the expanded sensor module is convenient for user, and the expanded sensor modules 120a~120c and the power module 130 included in the modular IoT sensor 100 can be configured on the basis of the best power generation manner and the requirement of sensing data at the detection place. And, the sensing data of the expanded sensor modules 120a~120c can be transmitted back to the network module 110 to send out the sensing data by wireless communication.

Although specific embodiments of the disclosure have been disclosed with reference to the above embodiments, these embodiments are not intended to limit the disclosure.

Various alterations and modifications may be performed on the disclosure by those of ordinary skills in the art without departing from the principle and spirit of the disclosure. Thus, the protective scope of the disclosure shall be defined by the appended claims.

What is claimed is:

1. A modular Internet of Things (IoT) sensor system, comprising:
    a network module, comprising a first female connector and a second female connector respectively disposed in two connection surfaces of the network module, wherein the first female connector and the second female connector are in shape and size conforming to a universal serial bus type-C specification, wherein a pin definition of the first female connector of the network module is complied with a first pin definition different from a pin definition of the universal serial bus type-C specification; and
    a first expanded sensor module, comprising:
        a male connector;
        a female connector, wherein the male connector and the female connector are respectively disposed in two connection surfaces of the first expanded sensor module, wherein the male connector of the first expanded sensor module is configured to detachably connect to the first female connector of the network module, wherein the male connector and the female connector are in shape and size conforming to the universal serial bus type-C specification, and wherein pin definitions of the male connector and the female connector are complied with the first pin definition; and
        a sensor, electrically connected between the male connector and the female connector, and wherein the sensor transmits sensing data through the male connector and the female connector.

2. The modular IoT sensor system of claim 1, wherein the first pin definition includes a power pin set, a shared pin set and a non-shared pin set, wherein the power pin set is configured to transmit a power, and wherein the power pin set conforms to the universal serial bus type-C specification.

3. The modular IoT sensor system of claim 2, wherein the shared pin set is configured to transmit electrical signals conforming to SPI protocol, I2C protocol, RS485 protocol or RS232 protocol.

4. The modular IoT sensor system of claim 2, wherein the non-shared pin set is configured to transmit analog or digital non-shared signal generated by a single sensor.

5. The modular IoT sensor system of claim 1, wherein the second female connector of the network module is configured to connect to a male connector of a power module, wherein the male connector of the power module is configured to provide power to the network module, and wherein the male connector of the power module are in shape and size conforming to the universal serial bus type-C specification.

6. The modular IoT sensor system of claim 1, wherein the first expanded sensor module further comprises:
    a plurality of internal connection lines, configured to connect a plurality of first pins of the male connector to a plurality of second pins of the female connector on a basis of a one-to-one correspondence between each pin of the male connector and a corresponding pin of the female connector,
    wherein the sensor is configured to generate the sensing data, wherein the sensor is coupled to at least portion of the internal connection lines, to transmit the sensing data through the at least portion of the internal connection lines to the network module, and wherein the network module processes and sends the sensing data.

7. A modular IoT sensor system, comprising:
a network module, comprising a first female connector and a second female connector respectively disposed in two connection surfaces of the network module, wherein the first female connector and the second female connector of the network module are in shape and size conforming to a universal serial bus type-C specification, wherein a pin definition of the first female connector of the network module is complied with a first pin definition different from a pin definition of the universal serial bus type-C specification;
a first expanded sensor module, comprising:
a male connector;
a female connector, wherein the male connector and the female connector are respectively disposed in two connection surfaces of the first expanded sensor module, wherein the male connector of the first expanded sensor module is configured to detachably connect to the first female connector of the network module, wherein the male connector and the female connector are in shape and size conforming to the universal serial bus type-C specification, and wherein pin definitions of the male connector and the female connector of the first expanded sensor module are complied with the first pin definition; and
a sensor, electrically connected between the male connector and the female connector, and wherein the sensor transmits sensing data through the male connector and the female connector; and
a second expanded sensor module, comprising a male connector and a female connector respectively disposed in two connection surfaces of the second expanded sensor module, wherein the male connector of the second expanded sensor module is configured to detachably connect to the female connector of the first expanded sensor module, wherein the male connector and the female connector of the second expanded sensor module are in shape and size conforming to the universal serial bus type-C specification, and wherein pin definitions of the male connector and the female connector of the second expanded sensor module are complied with the first pin definition.

8. The modular IoT sensor system of claim 7, wherein each of the first expanded sensor module and the second expanded sensor module further comprises:
a plurality of internal connection lines, configured to connect a plurality of first pins of the male connector to a plurality of second pins of the female connector on a basis of a one-to-one correspondence between each pin of the male connector and a corresponding pin of the female connector,
wherein the sensor is configured to generate sensing data, wherein the sensor is coupled to at least portion of the internal connection lines, to transmit the sensing data through the at least portion of the internal connection lines to the network module, and wherein the network module processes and sends the sensing data.

9. The modular IoT sensor system of claim 7, wherein the first pin definition includes a power pin set, a shared pin set and a non-shared pin set.

10. The modular IoT sensor system of claim 9, wherein the power pin set is configured to transmit a power, and wherein the power pin set conforms to the universal serial bus type-C specification.

11. The modular IoT sensor system of claim 9, wherein the shared pin set is configured to transmit electrical signals conforming to SPI protocol, I2C protocol, RS485 protocol or RS232 protocol.

12. The modular IoT sensor system of claim 9, wherein the non-shared pin set is configured to transmit analog or digital non-shared signal generated by a single sensor.

13. A modular IoT sensor system, comprising:
a network module, comprising a first female connector and a second female connector respectively disposed in two connection surfaces of the network module, the first female connector and the second female connector of the network module are in shape and size conforming to a universal serial bus type-C specification, a pin definition of the first female connector is complied with a first pin definition, wherein a pin definition of the second female connector is complied with a second pin definition, and wherein the first pin definition and the second pin definition are different from a pin definition of the universal serial bus type-C specification;
a first expanded sensor module, comprising:
a male connector;
a female connector, wherein the male connector and the female connector are respectively disposed in two connection surfaces of the first expanded sensor module, wherein the male connector of the first expanded sensor module is configured to detachably connect to the first female connector of the network module, wherein the male connector and the female connector of the first expanded sensor module are in shape and size conforming to the universal serial bus type-C specification, wherein pin definitions of the male connector and the female connector of the first expanded sensor module are complied with the first pin definition; and
a sensor, electrically connected between the male connector and the female connector, and wherein the sensor transmits sensing data through the male connector and the female connector; and
a power module, comprising a male connector and a female connector respectively disposed in two connection surfaces of the power module, wherein the power module is configured to generate and supply a power, wherein the male connector of the power module is configured to detachably connect to the second female connector of the network module, wherein the male connector and the female connector are in shape and size conforming to universal serial bus type-C specification, and wherein pin definitions of the male connector and the female connector of the power module are complied with the second pin definition.

14. The modular IoT sensor system of claim 13, wherein the first pin definition is different from the second pin definition.

15. The modular IoT sensor system of claim 13, wherein the second pin definition comprises a power pin set, a shared pin set and a non-shared pin set, wherein the power pin set is configured to transmit the power, and wherein the power pin set conforms to the universal serial bus type-C specification.

16. The modular IoT sensor system of claim 15, wherein the second pin definition further comprises a power interface pin set.

17. The modular IoT sensor system of claim 13, wherein the first pin definition includes a power pin set, a shared pin set and a non-shared pin set.

18. The modular IoT sensor system of claim 17, wherein the shared pin set is configured to transmit electrical signals conforming to SPI protocol, I2C protocol, RS485 protocol or RS232 protocol.

19. The modular IoT sensor system of claim 17, wherein the non-shared pin set is configured to transmit analog or digital non-shared signal generated by a single sensor.

20. The modular IoT sensor system of claim 13, wherein the power module further comprises a renewable energy charger.

* * * * *